(12) United States Patent
Ikeda et al.

(10) Patent No.: US 6,208,730 B1
(45) Date of Patent: Mar. 27, 2001

(54) KEY TOP ATTACHMENT STRUCTURE

(75) Inventors: Kazuhiro Ikeda; Shuuichi Sugawara, both of Miyagi; Kenichi Nishikawa, Kanagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/162,297

(22) Filed: Sep. 28, 1998

(30) Foreign Application Priority Data

Sep. 29, 1997 (JP) ........................................... 9-279394

(51) Int. Cl.[7] ........................................................ H04M 1/00
(52) U.S. Cl. ................................................ 379/368; 379/433
(58) Field of Search ..................................... 379/368, 369, 379/370, 433

(56) References Cited

U.S. PATENT DOCUMENTS 3,797,630 * 3/1974 Zilkha .................................. 379/368

* cited by examiner

Primary Examiner—Jack Chiang
(74) Attorney, Agent, or Firm—Pearne & Gordon LLP

(57) ABSTRACT

A key top attachment structure which makes the key-top attachment work easy, prevents the key top from being taken off from the outside, and suppresses looseness of the key top. A spring (11) provided with a rectangular hole (14), and lock portions (12A, 12B and 13) in which corresponding stoppers (22A, 22B and 23) of a key top (2) are to be locked respectively, are provided in a casing (1) of a small-sized electronic equipment such as an inter-call receiver or the like. A protrusion (21) which pushes the spring (11) at the time of attachment, a protrusion (24) which abuts against the spring (11) after attachment, a protrusion (25) which turns on a switch (3) on a printed board (4), and the stoppers (22A, 22B and 23) are provided in the key top (2).

15 Claims, 3 Drawing Sheets

KEY TOP ATTACHMENT STRUCTURE

BACKGROUND OF THE INVENTION

The present invention relates to an attachment structure of a key top used in a small-sized electronic equipment such as an inter-call receiver, or the like, and particularly relates to a key top attachment structure in which the structure of the key top is simple and the key top can be easily attached to a casing and held stably.

One or more switches are provided in a small-sized electronic equipment such as an inter-call receiver, or the like. A key top which is good and stable in manipulability of the switches and which is low in manufacturing cost has been desired.

Examples of conventional key tops include: a key top which has a stopper and which is pressed into a casing having a lock portion in which the stopper of the key top is locked; and another key top which has an elastic stopper and which is inserted into a casing while the stopper is being bent. A further key top is disclosed in JP-U-6-79042, which is provided with an arm having spring property for suppressing looseness and clattering between the key top and a casing.

Of the conventional key tops, the key top having a stopper pressed into a casing needs high-precision parts in order that the key top can be assembled while it is difficult to be taken off. If there are large variation in dimension of the parts, there is a problem that the key top or the casing is damaged or deformed at the time of assembling, or the key top is detached from the casing in use.

On the other hand, as for the key top which has an elastic stopper and which is inserted into the casing while the stopper is being bent, the key top is inevitably increased in size so as to obtain proper bending property of the stopper. Thus, there is a problem that a large space is required for installation of the key top.

On the other hand, the operation of the key top becomes heavier if there is provided a spring for eliminating looseness between the key top and the casing in order to prevent abnormal sound from being generated by vibrations caused by a calling vibrator or speaker singing in an intercall receiver. If a spring with a light load is used to make the key top operation lighter, a larger space is required. If such a spring is provided, the spring cannot be formed through resin molding integrally with the casing, and the spring has to be manufactured as a separate part. Accordingly, the number of parts increases, and the structure becomes complicated.

SUMMARY OF THE INVENTION

The present invention is intended to solve the foregoing conventional problems, and it is an object thereof to provide a key top attachment structure in which a key top can be attached to a casing without press-inserting a stopper into the casing, and in which the stopper and the casing are free from permanent deformation.

Another object of the present invention is to prevent abnormal sound or looseness from being produced by vibrations caused by a calling vibrator or speaker singing, with a simple structure and without making the operation of the key top heavier.

A further object of the present invention is to minimize a space required for attachment of the key top, and make it possible to assemble the key top easily from the outside of the casing.

According to the present invention, in order to solve the foregoing problems, the key top attachment structure is designed such that a casing includes a spring and a lock portion, and a key top includes a protrusion for pushing down the spring when the key top is attached to the casing from the outside of the casing, and a stopper locked in the lock portion for preventing the key top from being taken off from the outside of the casing. The key top is held by the spring and the lock portion.

With such a configuration that the key top is attached while the spring of the casing is being bent, the key top and the casing is free from permanent deformation, and the assembling work can be made easily. In addition, parts do not require so high precision in dimension. After attachment, the stopper of the key top is locked in the lock portion of the casing so that the spring prevents the key top from being taken off from the outside. Since the spring molded integrally with the casing abuts against the key top in the vicinity of the fulcrum of the key top, looseness can be eliminated with a simple structure and without making the operation of the key top heavier, and a required space can be minimized.

According to a first aspect of the present invention, a key top attachment structure for attaching a key top to a casing of a small-sized electronic equipment is arranged as follows: The casing includes a spring and a lock portion. The key top includes a protrusion for pushing down the spring when the key top is attached from the outside of the casing, and a stopper locked in the lock portion so that the key top cannot be taken off from the outside of the casing. The key top is held by the spring and the lock portion. Accordingly, there is an effect that it is possible to attach the key top to a casing without pressing the stopper, so that the stopper and the casing are not deformed permanently.

According to a second aspect of the present invention, the key top attachment structure according to first aspect is arranged such that the spring presses the key top, and the stopper abuts against the lock portion, whereby looseness between the casing and the key top is suppressed by an elastic force of the spring. There is an effect that the key top is held stably by means of the spring so that abnormal sound or looseness is prevented.

According to a third aspect of the present invention, the key top attachment structure according to the first aspect is arranged such that the spring presses the key top in the vicinity of a fulcrum of the key top to thereby make an operating force of the key top smaller than a reaction force of the spring. There is an effect that the key operation is made lighter even if a spring with a large reaction force is used.

According to a fourth aspect of the present invention, the key top attachment structure according to the first aspect is arranged such that the spring is provided with a hole, while a gradient for improving mold releasability at the time of resin molding is given to an outer circumference of the spring, and the casing and the spring are formed by integral molding. There is an effect that the structure is simplified so that the number of parts is reduced, and the strength is enhanced so that deformation at the time of resin molding can be prevented.

According to a fifth aspect of the present invention, the key top attachment structure according to the first aspect is arranged such that the protrusion is inserted through a hole formed in the spring, so that the position of the key top is restricted. There is an effect that the movement of the key top is restricted by the hole.

According to a sixth aspect of the present invention, a key top attachment structure for attaching a key top to a casing of a small-sized electronic equipment having a circuit board with a switch mounted thereon is provided. The casing includes a spring of a cantilever structure with a rectangular hole, a pair of first and second lock portions provided on opposite sides of the spring, and a third lock portion partially covering the rectangular hole on a fixed end side of the spring. The key top includes a pressure reception surface adapted to be pressed by a finger, first and second stoppers opposite from the pressure reception surface, a protrusion portion constituted by a third stopper, a first protrusion, and a second protrusion, and a third protrusion. The second protrusion temporarily abuts against the spring. The protrusion portion is inserted through the rectangular hole, so that the first, second and third stoppers are made to abut against the first, second and third lock portions correspondingly. The third protrusion is made to abut against a head of the spring. The first protrusion is made to face the switch provided under the rectangular hole so as to push down the switch. There is an effect that the key top can be assembled without necessity of high-precision parts and without deforming the key top and the casing, while the spring acts as a detachment prevention to prevent the key top from being detached from the outside.

According to a seventh aspect of the present invention, the key top attachment structure according to the sixth aspect of the present invention is arranged such that the key top is made possible to be attached to the casing from the outside of the casing when the spring is made possible to shift from a state where the head of the spring abuts against the second protrusion to a state where the head of the spring abuts against the third protrusion, while the key top is made impossible to be taken off from the outside of the casing when the spring is made impossible to shift from a state where the head of the spring abuts against the third protrusion to a state where the head of the spring abuts against the second protrusion. There is an effect that assembling is made easy, while the key top is prevented from being detached by an external impact.

According to an eighth aspect of the present invention, the key top attachment structure according to the sixth aspect is arranged such that the head of the spring abuts against the third protrusion so as to press the key top, and the first, second and third stoppers abut against the first, second and third lock portions respectively, so that looseness between the casing and the key top is suppressed by an elastic force of the spring. There is an effect that the key top is kept stable by the spring, so that abnormal sound or looseness is prevented.

According to a ninth aspect of the present invention, the key top attachment structure according to the sixth aspect is arranged such that the spring presses the key top in the vicinity of a fulcrum of the key top to thereby make an operating force of the key top smaller than an elastic force of the spring. There is an effect that the key operation is made lighter even if a spring with large elasticity is used.

According to a tenth aspect of the present invention, the key top attachment structure according to the sixth aspect is arranged such that the protrusion portion is inserted into the rectangular hole, so that the position of the key top is restricted. There is an effect that the movement of the key top is restricted by the rectangular hole.

According to an eleventh aspect of the present invention, a casing of a small-sized electronic equipment accommodating a circuit board with a switch mounted thereon and holding a key top for depressing the switch is provided, which comprises a spring for pressing the key top, and a lock portion for locking a stopper of the key top. There is an effect that abnormal sound or looseness produced by vibrations due to a calling vibrator or speaker singing can be prevented without making the operation of the key top heavier.

According to a twelfth aspect of the present invention, an inter-call receiver is provided, which comprises a circuit board with a switch mounted thereon, a key top for depressing the switch, and a casing accommodating the circuit board and holding the key top, wherein the casing includes a spring and a lock portion, and the key top includes a protrusion for pushing down the spring when the key top is to be attached to the casing from the outside of the casing, and a stopper for being locked in the lock portion so that the key top cannot be taken off from the outside of the casing, the key top being held by means of the spring and the lock portion. There is an effect that abnormal sound or looseness produced by vibrations due to a calling vibrator or speaker singing can be prevented without making the operation of the key top heavier.

According to a thirteenth aspect of the present invention, an inter-call receiver is provided, which comprises a circuit board with a switch mounted thereon, a key top for depressing the switch, and a casing accommodating the circuit board and holding the key top, wherein the casing includes a spring of a cantilever structure with a rectangular hole, a pair of first and second lock portions provided on opposite sides of the spring, and a third lock portion covering a part of the rectangular hole on a fixed end side of the spring; and the key top includes a pressure reception surface pressed by a finger, first and second stoppers formed on the opposite side to the pressure reception surface, a protrusion portion constituted by a third stopper, a first protrusion, and a second protrusion which temporarily abuts against the spring, and a third protrusion; wherein the protrusion portion is inserted through the rectangular hole; the first, second and third stoppers are made to abut against the first, second and third lock portions correspondingly; the third protrusion is made to abut against a head of the spring; and the first protrusion is made to face the switch provided under the rectangular hole so as to push down the switch. There is an effect that the key top can be assembled easily without necessity of high-precision parts and without deforming the key top and the casing, while the spring acts as a detachment prevention to prevent the key top from being detached from the outside.

DETAILED DESCRIPTION OF THE PREFERRED EMBODIMENT

A preferred embodiment of the present invention will be described in detail below with reference to FIGS. 1 to 6.

A key top attachment structure according to the embodiment of the present invention is arranged such that a spring with a rectangular hole and a lock portion are provided in a casing through integral molding, while a pressure reception surface, a stopper and a protrusion portion are provided in a key top, whereby the protrusion portion being inserted into the rectangular hole, the stopper is locked in the lock portion so as to be held by means of the spring and the lock portion, and the protrusion portion is made opposite to a switch so as to push the switch.

Figure 1:
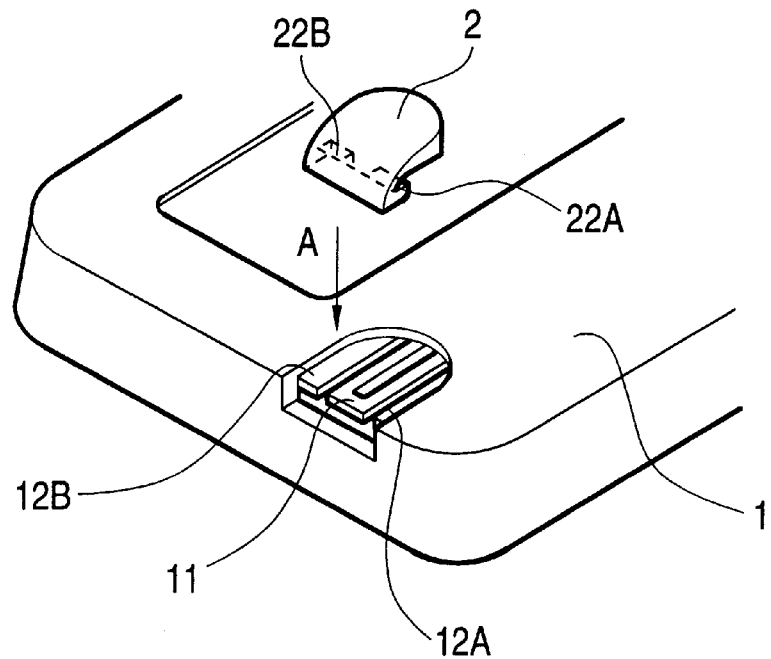
FIG. 1 is a perspective view illustrating a structure of a key top and a casing in a small-sized electronic equipment according to an embodiment of the present invention.
Figure 2:
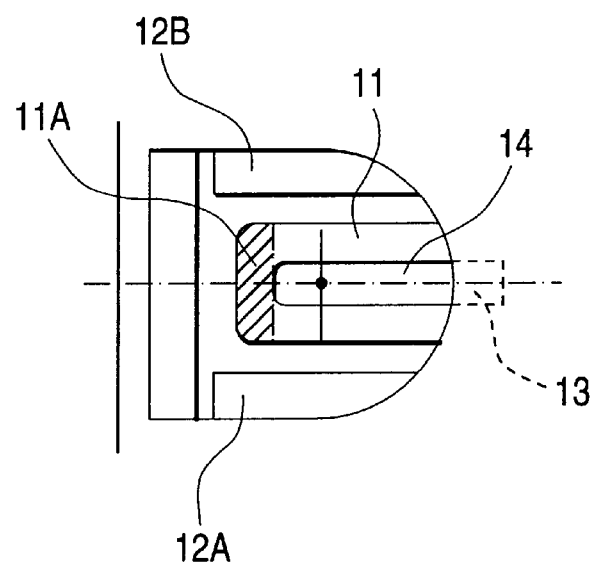
FIG. 2 is a view showing the casing, viewed from the direction A in FIG. 1.
Figure 3:
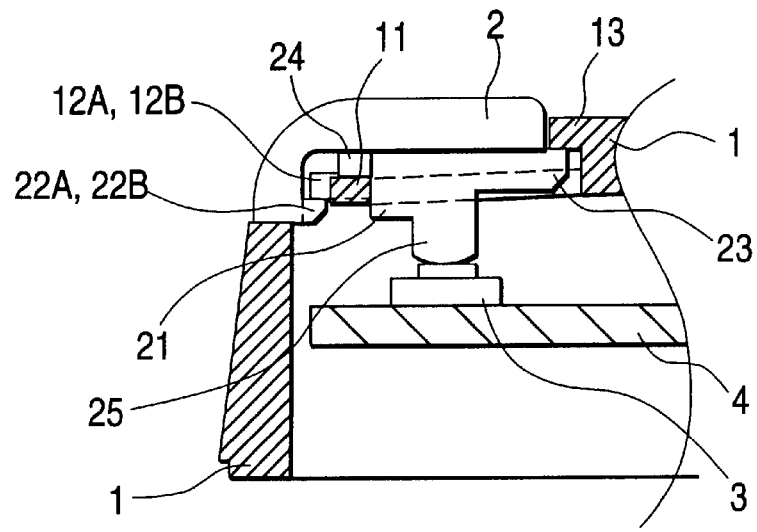
FIG. 3 is a sectional view showing a state where the key top has been assembled into the casing.
Figure 4:
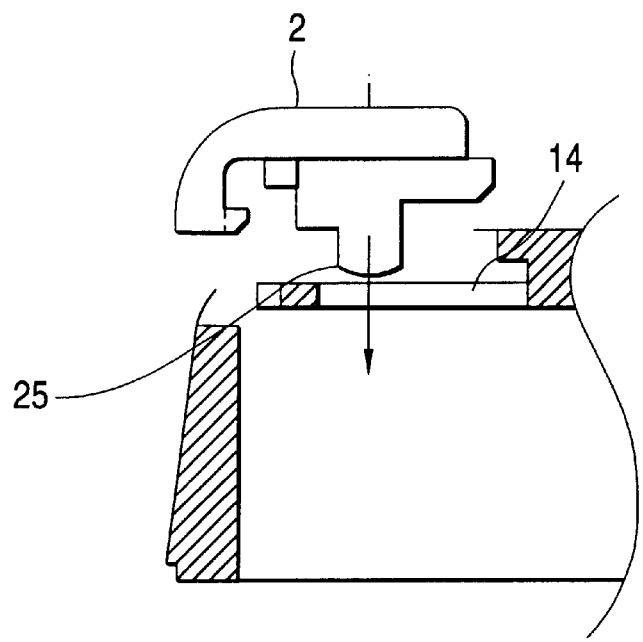
FIG. 4 is a view showing a method of assembling the key top into the casing.
Figure 5:
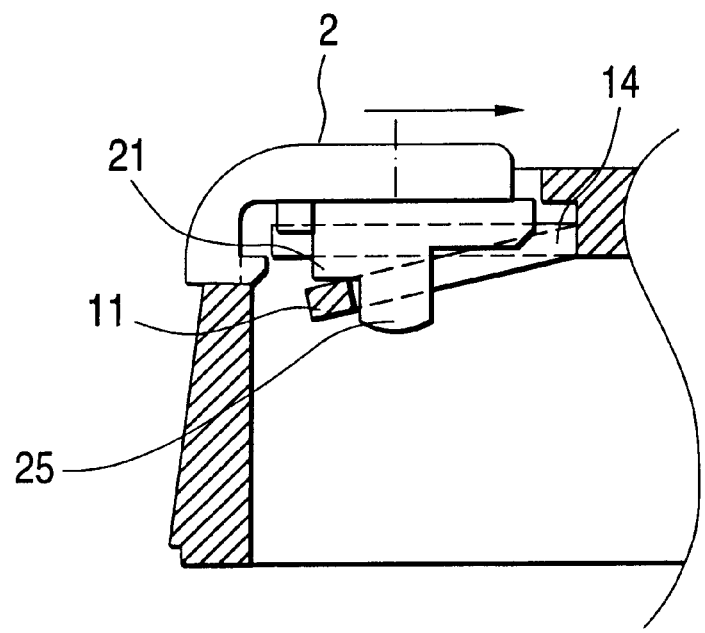
FIG. 5 is a view showing a method of assembling the key top into the casing.
Figure 6:
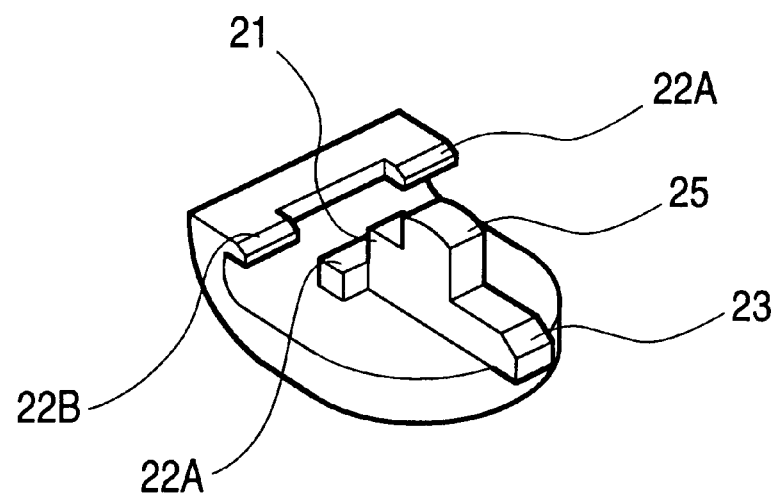
FIG. 6 is a perspective view of the key top viewed from the lower side thereof.

The key top arrangement structure will be described in more detail with reference to the accompanying drawings. FIGS. 1 to 5 are views showing a key top attachment structure. FIG. 1 is a perspective view illustrating the key top attachment structure. FIG. 2 is a view illustrating a casing, viewed from the direction A in FIG. 1. FIG. 3 is a view showing a section in a state that a key top has been assembled in the casing. FIGS. 4 and 5 are views showing a method of assembling the key top. In FIGS. 1 to 5, the reference numeral 1 represents the casing; 2, the key top; 3, a switch; and 4, a printed board.

The casing 1 is formed from synthetic resin or the like, and provided with a spring 11 molded integrally. In addition, the casing 1 is also provided with lock portions 12A, 12B and 13 for locking stoppers of the key top 2. A rectangular hole 14 is formed in the spring 11. The spring 11 is made strong in structure because it is formed into a U-shape by provision of the rectangular hole 14, so that it is hardly deformed by a force exerted to it when the casing is separated from a mold at the time of resin molding. In addition, a gradient for improving releasability from the mold at the time of resin molding is given to the outer circumference of the spring 11 so as to suppress deformation of the spring 11 at the time of molding.

The key top 2 is provided with stoppers 22A, 22B and 23 which are to be locked in the corresponding lock portions 12A, 12B and 13 of the casing respectively. In addition, the stoppers 22A and 22B act as fulcrums with respect to the motion of the key top 2. In FIG. 3, the key top 2 is prevented from coming off upward because the stopper 13 is locked in the lock portion 23, while the key top 2 is allowed to move downward.

When the key top 2 is inserted into the casing 1, a protrusion 21 abuts against a head 11A of the spring 11 and pushes the spring 11 downward. After the key top 2 has been attached, the protrusion 21 comes off from the head 11A of the spring 11, so that the protrusion 21 becomes free from the force of the spring 11. In addition, after the key top 2 has been attached, the protrusion 21 enters the rectangular hole 14 of the spring 11 so as to restrict the position of the key top 2 to prevent the key top 2 from moving leftward in FIG. 3.

A protrusion 24 always pushes the head of the spring 11 with a suitable force after the key top 2 has been attached. Thus, the key top 2 is always pushed down so as not to vibrate to cause abnormal sound because of vibrations due to a calling vibrator or speaker singing.

A protrusion 25 enters the rectangular hole 14 in a state in which the key top 2 has been attached, so that the protrusion 25 pushes a switch 3 to turn it on when the key top 2 is pushed down. When the switch 3 is pushed down, the switch 3 acts to push up the key top 2 through the protrusion 25 so as to return to its original state. At the same time, the spring 11 helps the switch 3 to push up the key top 2 through the protrusion 24. However, since the head of the spring 11 abuts against the key top 2 in the vicinity of the fulcrum of the key top 2, the amount of displacement of the protrusion 24 by the depression of the key top 2 is less in the vicinity of the fulcrum so that the operational load of the key top 2 is not affected so much.

Description will be made about a method of attaching the key top 2 to the casing 1. The key top 2 is inserted downward into the casing, as shown in FIG. 4. At this time, the protrusion 25 is inserted through the rectangular hole 14, and the protrusion 21 is also inserted into the rectangular hole 14 while pushing down the head of the spring 11.

Next, the key top 2 is slid rightward, so that the stoppers 22A, 22B and 23 of the key top 2 are locked respectively in the corresponding lock portions 12A, 12B and 13 of the casing 1, as shown in FIG. 5. At the same time as the key top 2 is slid, the protrusion 21 separates from the spring 11 and the protrusion 24 abuts against the spring 11. Thus, the protrusions 21 and 25 enter the rectangular hole 14 so that the position of the key top 2 is restricted in its planar direction. Thus, the key top 2 is prevented from coming off from the casing 1.

To separate the key top 2 from the casing 1 after the key top 2 is once attached to the casing 1, the spring 11 is moved down to such a position as shown in FIG. 5 by means of a tool such as pincettes (small pincers). The key top 2 is slid leftward in a procedure opposite to that performed at the time of attachment, and the protrusion 21 is made to come off from the rectangular hole 14. At the same time, the stoppers 22A, 22B and 23 are released from the corresponding lock portions 12A, 12B and 13 of the casing 1, and then pushed up. In such a manner, the key top 2 can be separated from the casing 1.

As has been described above, in the key top attachment structure, a spring with a rectangular hole and a lock portion are provided in a casing by integral molding. A pressure reception surface, a stopper and a protrusion portion are provided in a key top. The protrusion portion of the key top is inserted through the rectangular hole, and the stopper of the key top is brought into contact with the lock portion of the casing, so that the key top is pushed by a head of the spring, and a switch is pushed by a protrusion of the key top. Since the key top is attached while the spring of the casing is bent, there is no fear that the key top and the casing are deformed permanently at the time of assembling of the key top and the casing even in the case of parts which does not need high dimensional precision. Accordingly, assembling can be made easily. In addition, the stopper is locked in the lock portion of the casing after attachment of the key top, and the spring prevents the key top from coming off. Accordingly, the key top is never taken off from the outside. Further, the spring is brought into contact with the key top in the vicinity of the fulcrum of the key top, it is possible to eliminate looseness without making the operation of the key top heavier.

As has been described above, according to the present invention, a spring is pushed down by a protrusion of a key top, and a stopper is locked in a lock portion, so that the key top is held by means of the spring and the lock portion. By this structure, there is an effect that the work of attaching the key top becomes easy and the key top and the casing are never deformed permanently, even in the case where not-so-high-precision parts are used.

In addition, with such a structure in which the spring pushes the key top, and the stopper abuts against the lock portion, it is possible to obtain an effect that the looseness is suppressed between the casing and the key top by an elastic force of the spring, and abnormal sound is prevented from being caused by vibrations due to a calling vibrator or a speaker.

In addition, with such a structure in which the state where the head of the spring abuts against a third protrusion can not shift to the state where the head of the spring abuts against a second protrusion, it is possible to obtain an effect that the key top is never taken off from the outside.

In addition, since the spring and the lock portion are formed by integral molding with the casing, it is possible to obtain an effect that a space required for attachment of the key top can be minimized.

In addition, if the spring is constituted by two thin springs, there is a high possibility of deformation of the spring at the time of molding, and there is a fear that the spring lacks stability in quality. However, the spring is strong in structure because it is formed from a single body into a U-shape with a rectangular hole. It is therefore possible to obtain an effect that the spring is hardly deformed by a force exerted to it when the casing is separated from a mold at the time of resin molding.

What is claimed is:

1. A key top attachment structure for attaching a key top to a casing of a small-sized electronic equipment, said structure comprising:
   a casing including a spring and a plurality of lock portions, and
   a key top including a protrusion for pushing down said spring when said key top is attached from the outside of said casing, and a plurality of stoppers locked in said lock portions, respectively so that said key top is prevented from being taken off from the outside of said casing, said key top being held by said spring and said lock portions.

2. A key top attachment structure according to claim 1, wherein said spring presses said key top, and said stoppers abut against said lock portions, whereby looseness between said casing and said key top is suppressed by an elastic force of said spring.

3. A key top attachment structure according to claim 1, wherein said spring presses said key top in the vicinity of a fulcrum of said key top to thereby make an operating force of said key top smaller than a reaction force of said spring.

4. A key top attachment structure according to claim 1, wherein said spring is provided with a hole, while a gradient for improving mold releasability at the time of resin molding is given to an outer circumference of said spring, and said casing and said spring are formed by integral molding.

5. A key top attachment structure according to claim 1, wherein said protrusion is inserted through a hole formed in said spring to restrict the position of said key top.

6. A key top attachment structure for attaching a key top to a casing of a small-sized electronic equipment having a circuit board with a switch mounted thereon, said structure comprising:
   a casing including a spring of a cantilever structure with a rectangular hole, a pair of first and second lock portions provided on opposite sides with respect to said spring, and a third lock portion partially covering said rectangular hole on a fixed end side of said spring; and
   a key top including a pressure reception surface adapted to be pressed by a finger, first and second stoppers opposite from said pressure reception surface, a protrusion portion having a third stopper, a first protrusion, and a second protrusion, and a third protrusion;
   wherein:
   said second protrusion temporarily abuts against said spring;
   said protrusion portion is inserted through said rectangular hole;
   said first, second and third stoppers are made to abut against said first, second and third lock portions correspondingly;
   said third protrusion is made to abut against a head of said spring; and
   said first protrusion is made to face said switch provided under s a id rectangular hole so as to push down said switch.

7. A key top attachment structure according to claim 6, wherein:
   said spring is shiftable from a state in which the head of said spring abuts against said second protrusion to a state in which the head of said spring abuts against said third protrusion, thereby permitting said key top to be attached to said casing from the outside of said casing; and
   said spring is not shiftable from a state in which the head of said spring abuts against said third protrusion to a state in which the head of said spring abuts against said second protrusion, thereby prohibiting said key top from being taken off from the outside of said casing.

8. A key top attachment structure according to claim 6, wherein the head of said spring abuts against said third protrusion so as to press said key top, and said first, second and third stoppers abut against said first, second and third lock portions respectively, so that looseness between said casing and said key top is suppressed by an elastic force of said spring.

9. A key top attachment structure according to claim 6, wherein said spring presses said key top in the vicinity of a fulcrum of said key top to thereby make an operating force of said key top smaller than an elastic force of said spring.

10. A key top attachment structure according to claim 6, wherein said protrusion portion is inserted into said rectangular hole, so that the position of said key top is restricted.

11. A casing of a small-sized electronic equipment, said casing accommodating a circuit board with a switch mounted thereon and holding a key top for depressing said switch, said casing comprising:
    a spring for pressing said key top; and
    a plurality of lock portions for locking a plurality of stoppers of said key top.

12. An inter-call receiver comprising:
    a circuit board with a switch mounted thereon;
    a key top for depressing said switch; and
    a casing accommodating said circuit board and holding said key top, wherein:
    said casing includes a spring and a plurality of lock portions;
    said key top includes a protrusion for pushing down said spring when said key top is attached to said casing from the outside of said casing, and a plurality of stoppers locked in said lock portions, respectively, so that said key top is prevented from being taken off from the outside of said casing; and
    said key top is held by said spring and said lock portion.

13. An inter-call receiver comprising:
    a circuit board with a switch mounted thereon;
    a key top for depressing said switch; and
    a casing accommodating said circuit board and holding said key top, wherein:
    said casing includes a spring of a cantilever structure with a rectangular hole, a pair of first and second lock portions provided on opposite sides with respect to said spring, and a third lock portion partially covering said rectangular hole on a fixed end side of said spring;

said key top includes a pressure reception surface adapted to be pressed by a finger, first and second stoppers opposite from said pressure reception surface, a protrusion portion constituted by a third stopper, a first protrusion, and a second protrusion, and a third protrusion, wherein:

a second protrusion temporarily abuts against said spring;

said protrusion portion is inserted through said rectangular hole;

said first, second and third stoppers are made to abut against said first, second and third lock portions correspondingly;

said third protrusion is made to abut against a head of said spring; and said first protrusion is made to face said switch provided under said rectangular hole so as to push down said switch.

14. A key top attachment structure for attaching a key top to a casing of a small-sized electronic equipment, said structure comprising:

a casing including a spring and a lock portion, and a key top including a protrusion for pushing down said spring when said key top is attached from the outside of said casing in a first direction, and a stopper locked in said lock portion when said key top is slid along said case in a second direction perpendicular to said first direction, wherein said protrusion is engaged with said spring when said key top is slid along said case in said second direction, thereby preventing said key top from being slid in a third direction opposite from said second direction.

15. An inter-call receiver comprising:

a circuit board with a switch mounted thereon;

a key top for depressing said switch; and a casing accommodating said circuit board and holding said key top, wherein:

said casing includes a spring and a lock portion;

said key top includes a protrusion for pushing down said spring when said key top is attached to said casing from the outside of said casing in a first direction, and a stopper locked in said lock portion when said key top is slid along said case in a second direction perpendicular to said first direction; and said protrusion is engaged with said spring when said key top is slid along said case in said second direction, thereby preventing said key top from being slid in a third direction opposite from said second direction.

* * * * *